United States Patent [19]

Pekor

[11] 4,189,253
[45] Feb. 19, 1980

[54] PROCESS AND APPARATUS FOR MAINTAINING A DESIRED DEPTH OF A WATERWAY

[76] Inventor: Charles B. Pekor, P.O. Box 4010, Columbus, Ga. 31904

[21] Appl. No.: 918,393

[22] Filed: Jun. 23, 1978

[51] Int. Cl.² .............................................. E02B 3/02
[52] U.S. Cl. .......................................... 405/74; 37/61
[58] Field of Search ..................... 405/15, 52, 73, 74; 37/58, 61, 62, 63

[56] References Cited

U.S. PATENT DOCUMENTS

| | | | |
|---|---|---|---|
| 1,777,491 | 10/1930 | Harp | 405/73 X |
| 2,158,046 | 5/1939 | Prendergast | 405/74 X |
| 2,763,940 | 9/1956 | Madgwick | 405/74 X |
| 3,457,863 | 7/1969 | Carter | 37/61 X |
| 3,857,651 | 12/1974 | Bruno | 37/61 X |
| 4,074,535 | 2/1978 | Schoonmaker | 405/74 |

OTHER PUBLICATIONS

Jet Pump Sand Bypass System, Pekor Iron Works, Inc.

*Primary Examiner*—David H. Corbin
*Attorney, Agent, or Firm*—Jennings, Carter & Thompson

[57] ABSTRACT

Disclosed is a process and apparatus for maintaining a waterway at a desired depth, the bottom of which is subject to accumulation of sediment such as sand. The process comprises the placement of a plurality of jet pumps on a vertically movable support together with the step of fluidizing the sediment immediately beneath the pumps so that they sink by gravity at least to the desired depth of the waterway. The process further comprises supplying injection water to the sediment covered pumps and removing the sediment-water slurry from the pump. The apparatus disclosed is a support member spanning substantially the width of the waterway with such support being mounted for vertical movement relative to the bottom of the waterway. A plurality of jet pumps is mounted on the support member so that the entire array may be lowered at least to the desired depth of the waterway. Additionally, the structure on which the array of pumps is mounted may carry a conduit to which water under pressure is directed thereby to fluidize the bottom, permitting the pumps to be lowered or raised.

4 Claims, 10 Drawing Figures

PROCESS AND APPARATUS FOR MAINTAINING A DESIRED DEPTH OF A WATERWAY

This invention relates to a process and apparatus for maintaining waterways at a desired depth.

As is known, there is great difficulty in maintaining navigable channel depths at the entrances to inlets where sand is deposited due to littoral or alongshore drift. This problem typically occurs in every inlet where two conditions exist as follows: (a) beach sand moves along the shore line due to wave action in the presence of a source of sand; and (b) the tidal prism (total volume of water embayed between low and high tides) is insufficient to provide enough flow at high enough velocities to scour the deposited sand out of the inlet entrance.

The above conditions exist at virtually all man-made inlets and cause meandering of channels at many natural inlets.

The current method of dealing with this inlet shoaling problem is to bring in a dredge (usually a suction dredge) as soon as practical after the shoaling begins to restrict navigation. Dredging is generally unsatisfactory because of various problems. For instance, the most common cause of an emergency situation is a sustained storm which simultaneously closes inlets over a large stretch of coastline. In such event there simply are not enough dredges to clear all of these waterways at one time or, for that matter, within reasonable time. Further, nearly all affected inlets are the maintenance responsibility of some arm of some government. Before a dredge can be put to work funds must be allocated, surveys and drawings made, bids advertised and taken, and finally, each inlet must await its turn for the services of the limited number of dredges. Since these entrances usually contain a relatively small amount of sand, the cost of moving in and deploying a dredge, pipeline and other equipment is extremely high, on a cubic yard basis.

With the foregoing in mind, my invention comprises a process and apparatus in which a pattern or array of jet pumps is placed at the inlet mouth so as to intercept and remove the sand as it is deposited. In very severe storms where the sand accretion rate exceeds the capacity of the pumps, they may be shut down until the storm subsides. Then, the pumps are activated and in a few hours a navigable channel has been restored, probably by the time the sea moderates enough for boats to use the inlet.

As will hereafter appear, an object of my invention is to provide a system of the character designated which employs basic elements as follows: means is provided for fluidization of the sand immediately under, adjacent, and above the pumps and supporting structure therefor is accomplished by auxilliary piping attached to the underside of the assembly. These pipes have a number of openings, downwardly directed, so that when water under pressure is forced through said openings the sand surrounding the pumps and their supporting structure is fluidized. In this fashion I can lower the pumps and their supporting structure into the bottom and to a depth greater than the desired depth of the waterway. By so fluidizing the bottom the entire array may be raised for servicing and replacement when necessary.

Apparatus illustrating the constructional features of my invention and which may also be used to carry out my improved process is shown in the accompanying drawings in which.

Figure 1:
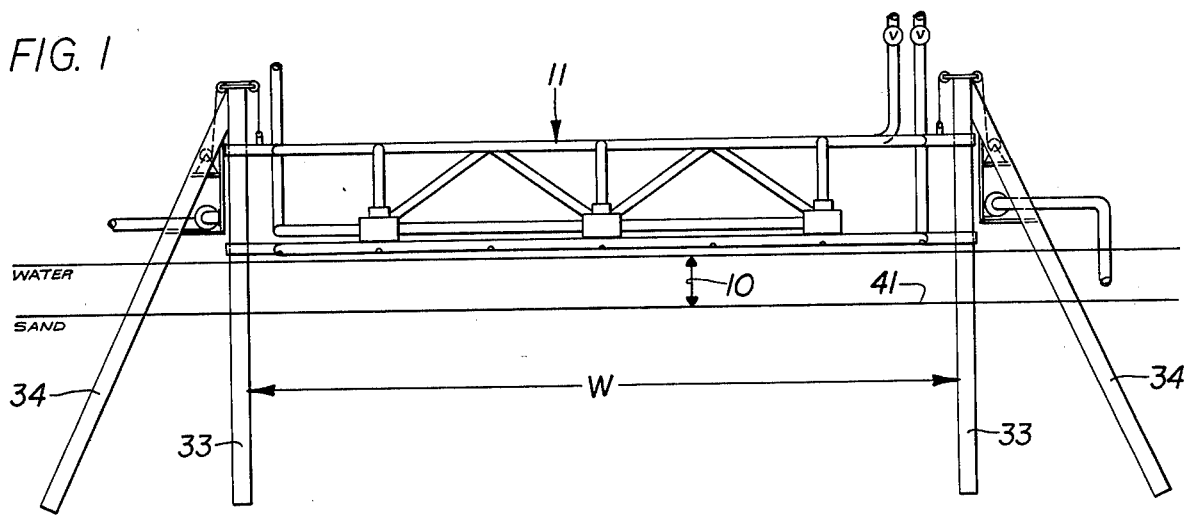
FIG. 1 is an elevational view of my improved apparatus with the pumps and supporting structure in raised position, namely, raised above the water level.

Referring now to the drawings for a better understanding of my invention, it will be seen that the object is to maintain a waterway generally of the width indicated by the line W in FIG. 1 to a depth indicated substantially by the line 10.

My improved apparatus may comprise a vertically movable structure indicated generally by the numeral 11. This structure comprises a plurality of jet pumps indicated by the numeral 12, the inlet openings 13 of which are upwardly directed. The pumps 12 are spaced as indicated and are mounted directly onto a conduit 16. Cross braces 17 also are employed.

At 18 I show a conduit which as later will appear is the conduit common to all the pumps through which is supplied injection water for the pumps. From the conduit 18 I provide branch conduits 19 leading to the injection side of each of the pumps 12.

The conduit 16 is provided with a riser section 21. A short length of conduit 22 cross connects the upper ends of the conduits 18 and 21. Water under pressure from a pump 23 is supplied to the head of pipe 22 through a flexible conduit 24. Valves 26 and 27 make possible the supply of water under pressure from the pump, selectively, either to the pipe 18 or the pipe 16.

The outlets of the pumps are connected to a common discharge conduit 28 through a number of branch conduits 29. The conduit 28 is connected through a flexible conduit 31 to a suction pump 32.

The entire assembly 11 is mounted for vertical movement. Thus, at each side of the waterway I provide vertical posts or columns 33. The columns 33 are braced by other columns 34. Slidably surrounding the columns 33 are ring sections 36 which are connected to the assembly 11. Cables 37 pass upwardly over sheaves 38 thence downwardly to powered winches 39. In this fashion the entire assembly 11 may be raised and lowered.

Figure 2:
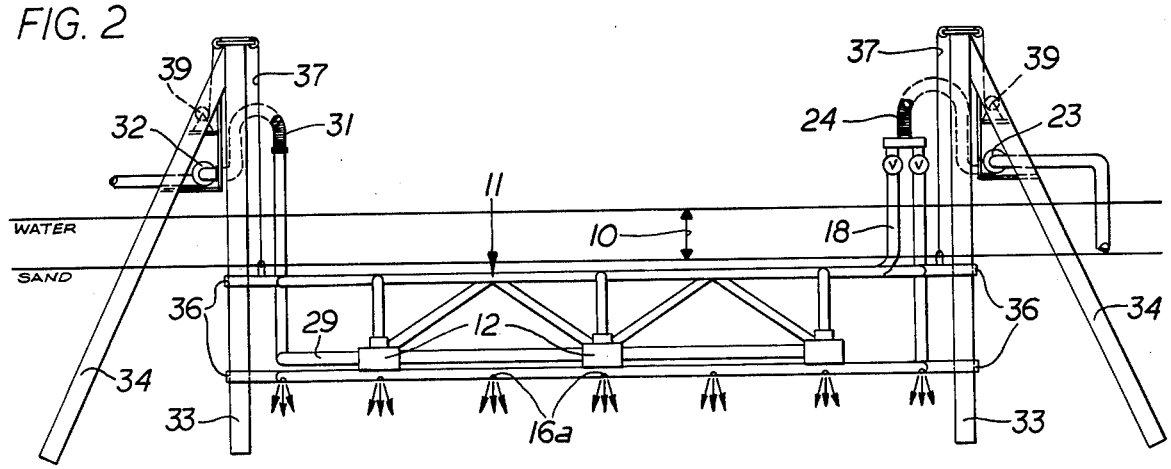
FIG. 2 is a view with the pumps and supporting structure lowered to a depth greater than the depth of the waterway to be maintained.
Figure 3:
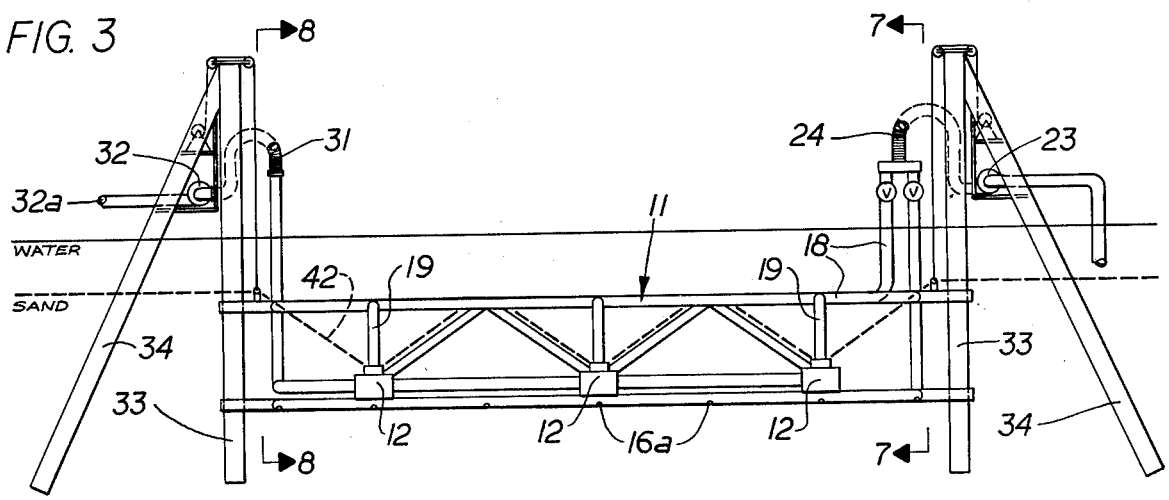
FIG. 3 is a view showing the condition of the bottom of the waterway after the pumps have been operated for a length of time sufficient to remove the sand to the desired level.
Figure 4:
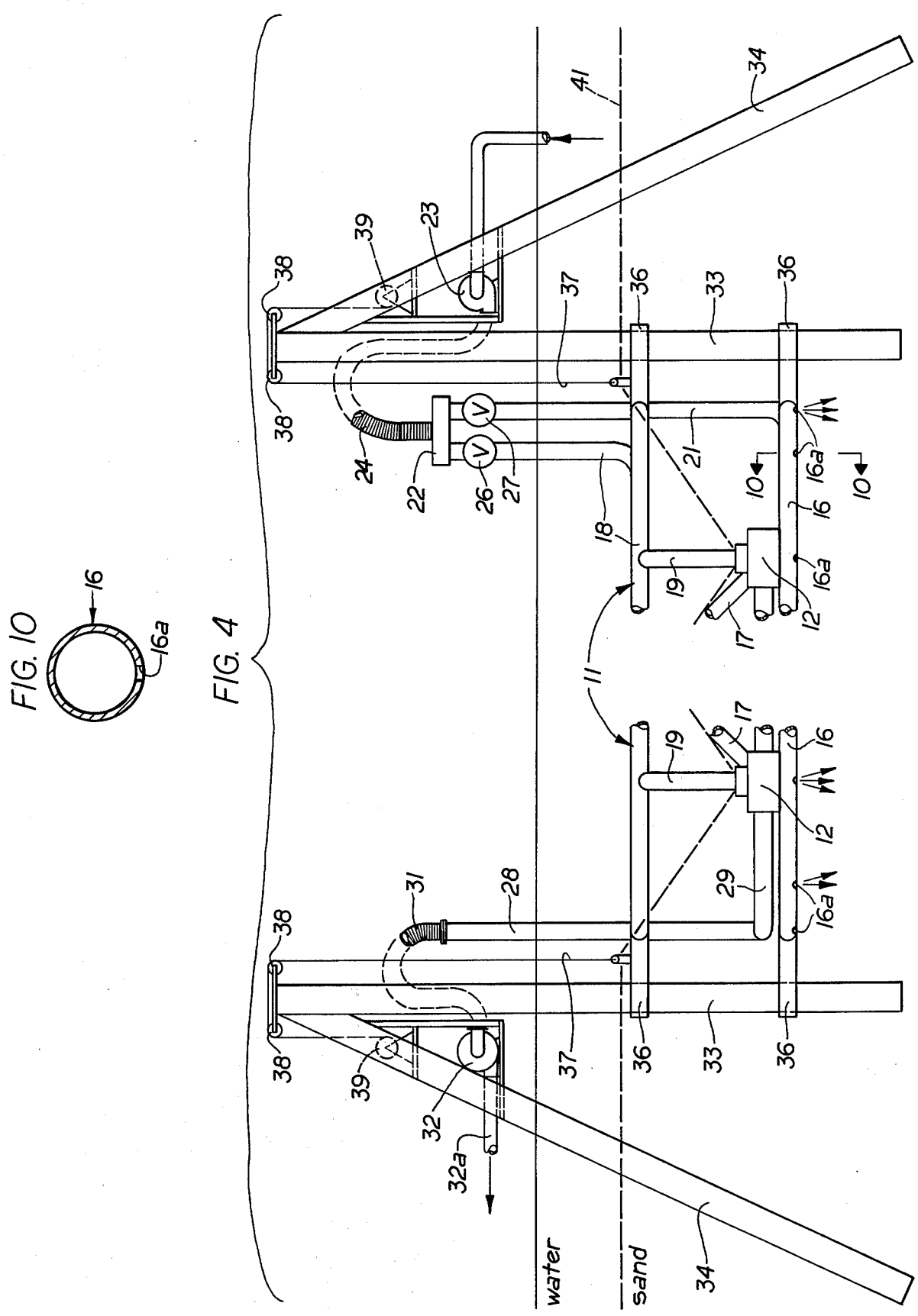
FIG. 4 is an enlarged detail fragmental view corresponding to FIG. 3.

From the foregoing description the advantages of my improved apparatus and process may now be explained more fully. When it is desired to install the apparatus at a given location the columns 33 are erected and are steadied by the columns 34. The entire apparatus 11 may be fabricated on shore and brought into position with the rings 36 surrounding posts 33. The pumps 23 and 32 and winches 39 together with the cable arrangement is installed, all of the apparatus being above water at this point of the installation as shown in FIG. 1. Through operation of the winches 39 the entire assembly is lowered to the bottom which it will be assumed is indicated by the line 41, namely, that the line 41 is the level below the water surface which it is desired to maintain for navigation purposes. With the pipe 16 resting on the top of the sand or other sediment type floor, valve 27 is opened and valve 26 is closed. Pump 23 is started, whereby water under pressure is forced into the conduit 16 and throughout the multiplicity of openings 16$^a$ therein as indicated by the arrows, FIGS. 2 and 4. This fluidizes the sand in the immediate area of the entire apparatus so that it sinks by gravity to the desired level. In other words, without the aid of any other piece of equipment or apparatus my improved apparatus "digs" itself into the bottom by fluidizing the bottom sediment.

The apparatus is now in place, ready to maintain the bottom of the waterway at approximately the line 41. When sand commences to accumulate in the waterway, valve 27 is closed and valve 26 is opened. Pump 32 is energized and its line 32$^a$ leads away from the waterway to a place of disposal of the sand. Even though the pumps may now be buried under as much as eight to ten feet of sand, forcing injection water into them causes them to operate, whereby sand is drawn into the inlets 13 as a water-slurry. This slurry is discharged through the common conduit 28, being helped by pump 32 whereby it may be discharged through the conduit 32$^a$ to any place desired, away from and out of the waterway.

Figure 5:
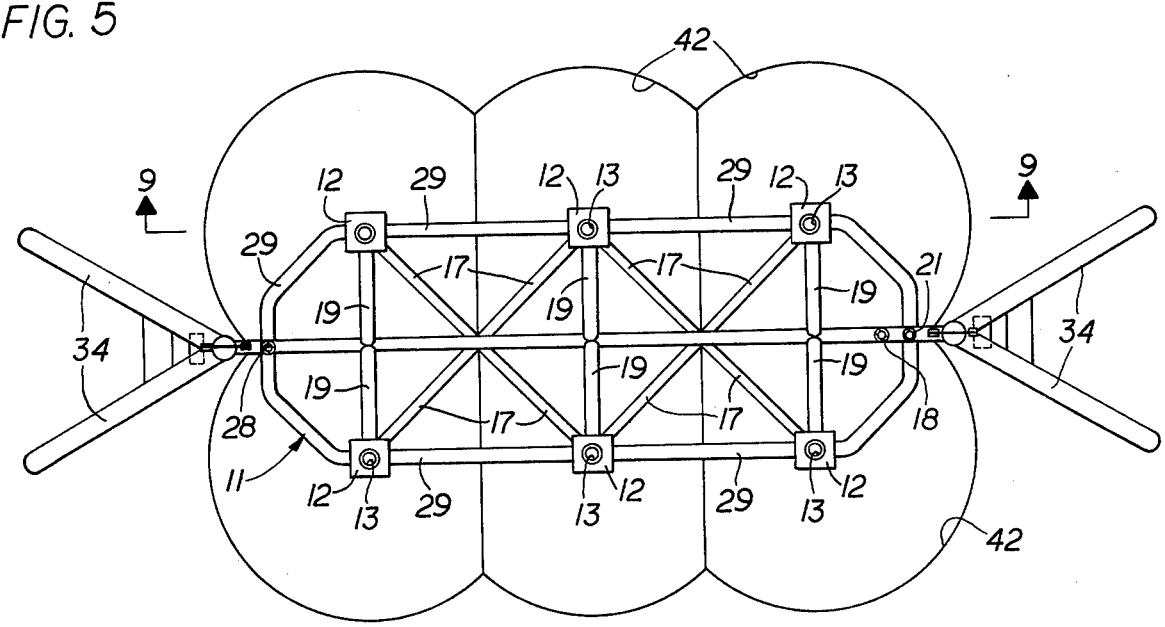
FIG. 5 is a plan view drawn to the scale of FIGS. 1 to 3, inclusive, and showing the pattern of removal of sand from the bottom.
Figure 6:
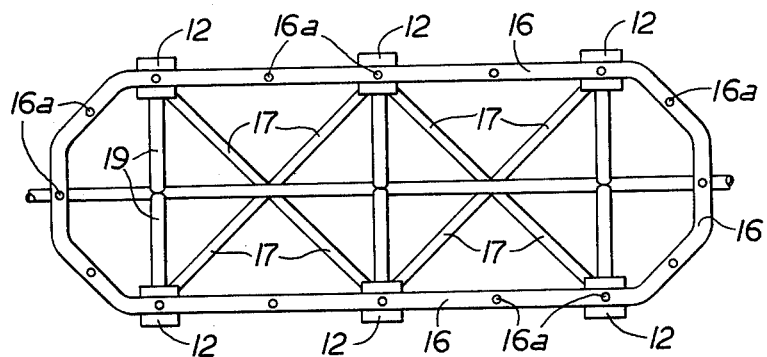
FIG. 6 is a bottom view showing the fluidizing pipe.
Figure 9:
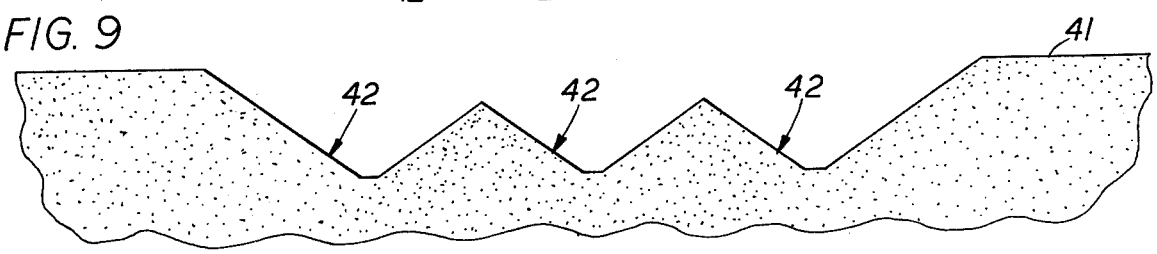
FIG. 9 is a detail sectional view taken generally along line 9—9 of FIG. 5 and showing the configuration of the bottom after being pumped; and, FIG. 10 is an enlarged detail sectional view taken generally along line 10—10 of FIG. 4.
Figure 7:
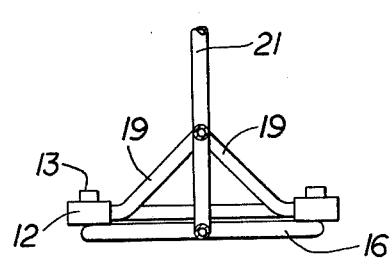
FIG. 7 is a detail fragmental sectional view taken generally along line 7—7 of FIG. 3.
Figure 8:
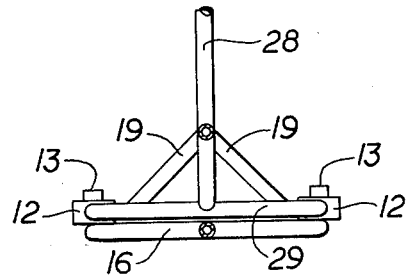
FIG. 8 is a detail fragmental sectional view taken generally along line 8—8 of FIG. 3.

It will be noted that the bottom 41 is maintained by each of the pumps 12 producing a crater indicated at 42, FIGS. 5 and 9. The pumps are so arranged that the fields of operation of the same overlap thus to provide the pattern as viewed in plan, FIG. 5, and in contour as viewed in FIG. 9.

If it be assumed that the sand has now completely filled all of the craters so that the assembly 11 is completely submerged, and it is desired to raise the same, water under pressure is again forced through the conduit 16 thus to fluidize the entire bed whereby the winches 39 may raise the entire apparatus above water level to the position of FIG. 1.

From the foregoing it will be apparent that I have devised an improved process and apparatus for maintaining waterways. My improved apparatus is characterized by the fact that it can be left in position, ready to be operated whenever necessary. This obviates completely the necessity of bringing in dredges to maintain the waterway at a desired depth. Further, the sand removed from the bottom may be transported to a nearby beach which needs nourishment thus not only providing a convenient place for disposing of the sand from the bottom, but also putting it to a useful purpose.

While I have shown my invention in but one form, it will be obvious to those skilled in the art that it is not so limited, but is susceptible of various changes and modifications without departing from the spirit thereof.

What I claim is:

1. The process of maintaining a desired depth of a waterway wherein the bottom is subject to accumulation of sediment such as sand,
   (a) permanently placing an array of jet pumps on a common, vertically movable support, which support substantially spans the waterway and is mounted for said vertical movement by means alongside the waterway,
   (b) lowering the entire array of pumps to a depth greater than the desired depth of the waterway,
   (c) supplying injection water to each of the pumps from a common source of water under pressure whenever sediment accumulates enough to decrease the desired depth of the waterway, whereby the sediment is discharged by the pumps as a sediment-water slurry, and
   (d) removing the sediment-water slurry from the waterway through a common conduit.

2. The process of maintaining a desired depth of a waterway wherein the bottom is subject to accumulation of sediment such as sand,
   (a) permanently placing an array of jet pumps on a common, vertically movable suport, which support substantially spans the waterway and is mounted for said vertical movement by means alongside the waterway,
   (b) lowering the array of pumps onto the bottom comprised of the sediment,
   (c) fluidizing the sediment immediately beneath the entire array of pumps whereby the pumps sink by gravity to a depth greater than the desired depth of the waterway,
   (d) supplying each of the thus submerged pumps with injection water under pressure from a common source whereby the sediment is discharged by the pumps as a sediment-water slurry, and
   (e) removing the sediment-water slurry from the pumps through a common conduit.

3. In apparatus for removing pumpable solids such as sand or the like from the bottom of a waterway or the like,
   (a) a support member spanning substantially the width of the waterway,
   (b) means alongside the waterway mounting the support member for vertical movement relative to the bottom of the waterway,
   (c) means mounting a plurality of jet pumps on the support member and so positioned relative to each other thereon as to receive sediment from the bottom of the waterway,
   (d) means to supply injection water under pressure to each of the pumps, and
   (e) means to discharge the sediment as a water slurry from the pumps whereby it may be conveyed away from its place of removal.

4. Apparatus as defined in claim 3 in which there are conduits disposed generally beneath the pumps, there being downwardly directed openings in said conduits through which water under pressure is directed, thereby to fluidize the bottom, whereby the pumps may be lowered into the bottom sediment to a depth greater than the desired depth for the waterway.

* * * * *